US012595129B2

(12) United States Patent
Chatain et al.

(10) Patent No.: US 12,595,129 B2
(45) Date of Patent: Apr. 7, 2026

(54) STATION FOR PRESENTING CONTAINERS

(71) Applicant: EXOTEC, Croix (FR)

(72) Inventors: Marc Chatain, Zimmerbach (FR); Loïc Lepillier, Wasquehal (FR)

(73) Assignee: EXOTEC, Croix (FR)

( * ) Notice: Subject to any disclaimer, the term of this patent is extended or adjusted under 35 U.S.C. 154(b) by 359 days.

(21) Appl. No.: 18/043,195

(22) PCT Filed: Aug. 27, 2021

(86) PCT No.: PCT/EP2021/073787
§ 371 (c)(1),
(2) Date: Feb. 27, 2023

(87) PCT Pub. No.: WO2022/043521
PCT Pub. Date: Mar. 3, 2022

(65) Prior Publication Data
US 2023/0406637 A1 Dec. 21, 2023

(30) Foreign Application Priority Data
Aug. 31, 2020 (FR) ...................................... 2008812

(51) Int. Cl.
*B65G 1/137* (2006.01)
*B65G 1/04* (2006.01)
*B65G 57/30* (2006.01)

(52) U.S. Cl.
CPC ......... *B65G 1/1378* (2013.01); *B65G 1/0464* (2013.01); *B65G 1/0485* (2013.01); *B65G 57/303* (2013.01); *B65G 2201/0235* (2013.01)

(58) Field of Classification Search
CPC ................................................... B65G 1/0485
See application file for complete search history.

(56) References Cited

U.S. PATENT DOCUMENTS 2,947,125 A 8/1960 Wilson et al.
4,909,697 A * 3/1990 Bernard, II .......... B65G 1/1378
198/463.3

(Continued)

FOREIGN PATENT DOCUMENTS

EP 3647231 A1 5/2020
WO 2007011871 A2 1/2007

(Continued)

OTHER PUBLICATIONS

Search Report issued on Nov. 18, 2021, in corresponding International Patent Application No. PCT/EP2021/073787, 6 pages.

*Primary Examiner* — Mark C Hageman
(74) *Attorney, Agent, or Firm* — Maier & Maier, PLLC

(57) ABSTRACT
A station for presenting at least one container, which includes a frame, a conveying device having a first conveyor and a mobile platform provided with a second conveyor. Also, a method for presenting containers implemented by this station for presenting at least one container, which includes the steps of depositing a first container at a first point of delivery, controlling the first conveyor to transfer the first container to a point of transfer, actuating the movable platform to transfer the first container from the point of transfer to a point of presentation, and controlling the second conveyor to transfer the first container from the point of presentation to a point of evacuation.

16 Claims, 20 Drawing Sheets

(56) References Cited

U.S. PATENT DOCUMENTS

| | | | | |
|---|---|---|---|---|
| 8,996,157 | B2 * | 3/2015 | Collin .................. | B65G 1/1378 |
| | | | | 700/214 |
| 10,150,626 | B2 * | 12/2018 | Eisenberg .............. | B65G 47/46 |
| 10,913,607 | B2 * | 2/2021 | Hognaland .......... | B65G 1/0464 |
| 11,305,935 | B2 * | 4/2022 | Blotnik ................ | B65G 1/0492 |
| 11,427,409 | B2 * | 8/2022 | Chintalapalli Patta ...................... | |
| | | | | B65G 1/0464 |
| 11,505,198 | B2 * | 11/2022 | Austrheim ........... | B65G 1/0414 |
| 11,794,994 | B2 * | 10/2023 | Lindbo ................ | B65G 1/0414 |
| 12,098,029 | B2 * | 9/2024 | Austrheim .............. | B65G 1/06 |
| 12,134,411 | B2 * | 11/2024 | Austrheim ............. | B65G 63/06 |
| 2007/0071585 | A1 * | 3/2007 | Henkel ................ | B66F 9/0755 |
| | | | | 414/471 |

FOREIGN PATENT DOCUMENTS

| | | | |
|---|---|---|---|
| WO | 2017211640 | A1 | 12/2017 |
| WO | 2020074717 | A1 | 12/2017 |
| WO | 2018069282 | A1 | 4/2018 |

* cited by examiner

STATION FOR PRESENTING CONTAINERS

FIELD

The invention relates to the field of package conveying and, more particularly, the orientation of the packages in a package routing and distribution system.

BACKGROUND

Automated systems for storing and supplying containers are known and comprise a container storage volume in which an automated trolley for taking and conveying containers moves around. The trolley is driven by an electronic control unit which designates one or more containers to be delivered to a container presentation station.

Generally, the trolley deposits the container at a first point of delivery on the rotary mat of a carousel which brings the container to a container presentation point at which an operator can access the content of the container. Once the desired elements have been removed from the container by the operator, the rotary mat returns the container from the point of presentation to a point of evacuation where the automatic system retrieves the container to replace it in the storage zone.

Such a carousel requires the operator to be trained in the risks that all of the moving parts represent and imposes precautions of use such as safety mechanisms which hamper the productivity of the presentation station in terms of volume of containers presented per unit of time. The bulk of such a presentation station reduces the number of stations that can be installed linked with a storage system, which limits also the productivity of the storage system in terms of volume of containers presented per unit of time.

The object of the invention is to improve the productivity of an automated system for storing and supplying containers comprising a presentation station.

SUMMARY

To this end, a station is provided for presenting at least one container comprising a frame delimiting an external volume and an internal volume and having an aperture for access to the internal volume, a conveying device contained at least partially in the internal volume and which comprises a first chimney for supplying containers to a first point of delivery, the first chimney being and extending in a first direction of supply. The conveying device also comprises a second chimney for evacuating containers from a second point of evacuation, the second chimney being and extending in a second direction of evacuation. The presentation station also comprises a first motorized transfer conveyor for transferring a container in a third direction of transfer from the first point of delivery to a third point of transfer. According to the invention, a movable platform is provided with a second motorized conveyor and the movable platform is arranged to move the second conveyor in a fourth direction of transfer between the third point of transfer and a fourth point of presentation arranged in such a way that an internal volume of a container situated at the fourth point of presentation is accessible by an operator from the external volume, the second conveyor being arranged to transfer a container from the fourth point of presentation to the second point of evacuation in a fifth direction of transfer.

A compact presentation station is thus obtained which requires a smaller footprint compared to the solutions of the prior art and makes it possible to improve the productivity of a given storage area.

The compactness of the presentation station is further improved while constituting a provisioning buffer when the first length of the first conveyor is chosen to accommodate two containers and/or the second length of the second container is chosen to accommodate a single container.

The compactness of the station is further improved when the movable platform is of "scissor lift table" type and/or the second direction of evacuation is substantially parallel to the first direction of supply and/or the third direction of transfer is substantially orthogonal to the first direction of supply and/or orthogonal to the second direction of evacuation.

The compactness of the presentation station is further optimized when the fourth direction is substantially orthogonal to the third direction.

It is possible for the presentation station to be used by a user with no particular training when the presentation station comprises a covering device for covering the access aperture.

Advantageously, when the frame rests on a horizontal support, the first direction of supply, the second direction of evacuation and the fourth direction of transfer are vertical, and in which the third direction of transfer and the fifth direction of transfer are horizontal.

More advantageously, the presentation station comprises a device for preventing the extraction of a container through the access aperture.

The compactness of the presentation station is further enhanced when the station comprises a stacking device for stacking containers to produce a stack of containers resting at the second point of evacuation.

A stacking device is obtained that is particularly robust and reliable when the stacking device for stacking containers comprises an arm linked to the movable platform and/or the stacking device for stacking containers comprises at least one elastic jaw.

The invention applies also to an automated system for storing and supplying containers comprising a storage volume linked to at least one presentation station as defined above.

The invention applies also to a method for presenting containers implemented by a presentation station as defined above, the method comprising the following steps:

depositing a first container at the first point of delivery;

controlling the first conveyor so as to transfer the first container to the third point of transfer;

actuating the movable platform so as to transfer the first container from the third point of transfer to the fourth point of presentation;

controlling the second conveyor so as to transfer the first container from the fourth point of presentation to the second point of evacuation.

Advantageously, when the first length of the first conveyor is chosen to accommodate two containers and the second length of the second container is chosen to accommodate a single container, the method comprises the following additional steps:

prior to the step of controlling the first conveyor so as to transfer the first container from the first point of delivery to the third point of transfer, controlling the first conveyor so as to free the first point of delivery while keeping the first container on the first conveyor;

depositing a second container at the first point of delivery;

after the step of controlling the first conveyor so as to transfer the first container to the third point of transfer, depositing a third container at the first point of delivery.

The use of the presentation station is made safe when, the presentation station comprising a covering device for covering the access aperture, the method comprises an additional step, situated between the step of actuating the movable platform so as to transfer the first container from the third point of transfer to the fourth point of presentation and the step of controlling the second conveyor so as to transfer the first container from the fourth point of presentation to the second point of evacuation, the additional step consisting in actuating the covering device so as to free the access aperture then actuating the covering device so as to cover the access aperture.

The volume of containers presented is improved when, the presentation station comprising a stacking device for stacking containers to produce a stack of containers resting at the second point of evacuation, the method comprises the step of producing a stack of containers at the second point of evacuation.

Other features and advantages of the invention will emerge on reading the following description of particular, nonlimiting embodiments of the invention.

DETAILED DESCRIPTION

Figure 1:
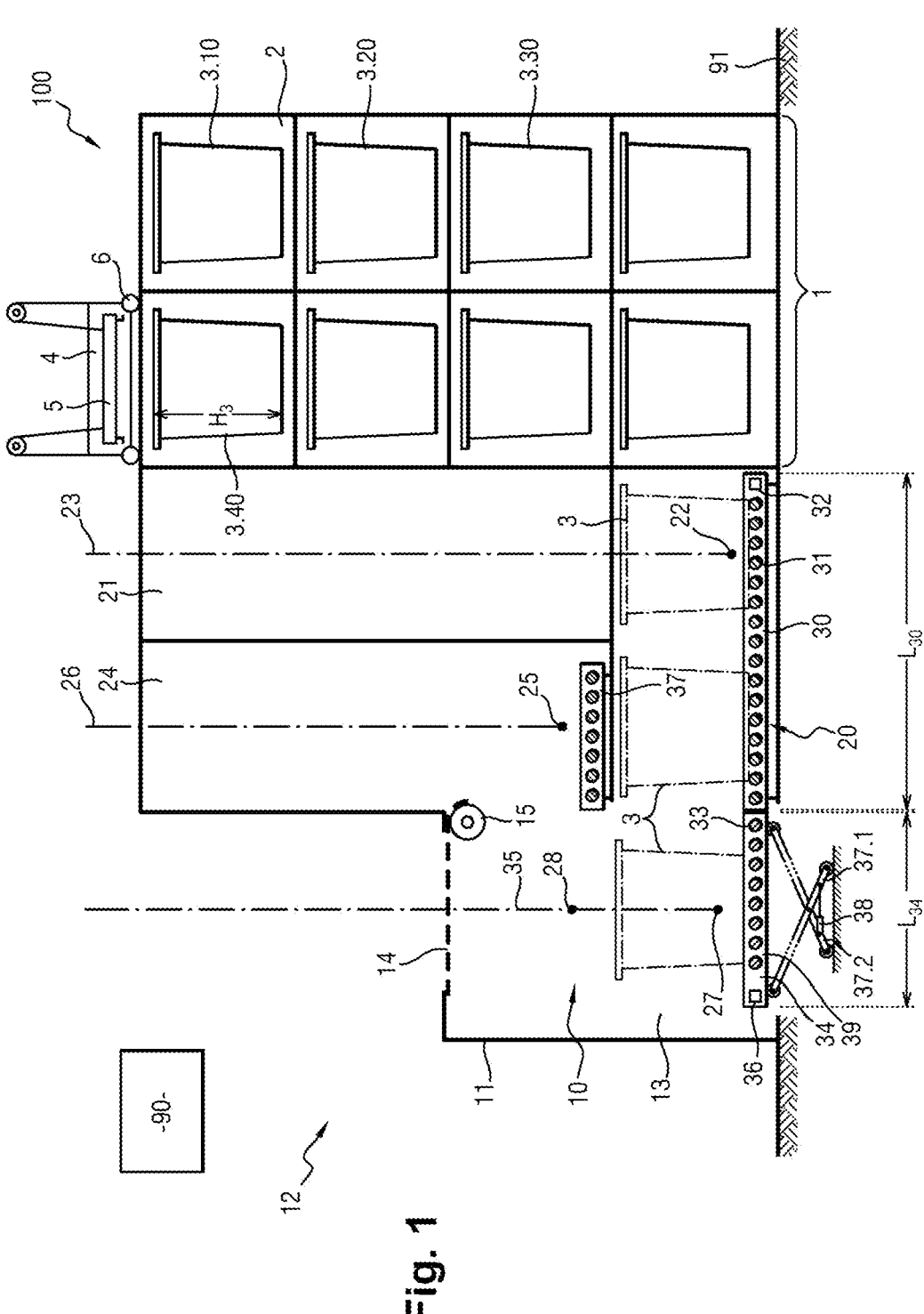
FIG. 1 is a plan schematic view of an automated storage system according to a first embodiment of the invention, the automated storage system being in a first state.

Referring to FIGS. 1 to 9, the automated system for storing and supplying containers according to the invention, and generally designated 100, comprises a storage volume 1 linked to a presentation station 10. The storage volume 1 comprises a plurality of cells 2 each enclosing a substantially parallelepipedal container 3 of first width 1, of first length L3 and of first height H3. For example purposes, four containers 3 will be considered: a first container 3.10, a second container 3.20, a third container 3.30 and a fourth container 3.40. An automated trolley has a grab 5 for gripping a top portion of each container 3. The trolley 4 is provided with wheels 6 to move around on an upper part of the storage volume 1 according to modalities known to the person skilled in the art. The trolley 4 and the presentation station 10 are linked to an electronic control unit 90.

The presentation station 10 comprises a frame 11 delimiting an external volume 12 and an internal volume 13. The frame 11 is, here, represented resting on a horizontal surface 91. The frame 11 has an aperture 14 for access to the internal volume 13. The aperture 14 is, here, rectangular of second width 114 and of second length L14. An electric rolling shutter 15 extends in front of the aperture 14 to selectively cover the access aperture 14.

The internal volume 13 encloses a conveying device 20 which comprises a first chimney 21 of supply which emerges on a first point of delivery 22. The first chimney 21 is substantially rectilinear and extends in a first, vertical direction of supply 23. The conveying device also comprises a second chimney 24 of evacuation which emerges on a second point of evacuation 25. The second chimney 24 is substantially rectilinear and extends in a second, vertical direction of evacuation 26. A first transfer conveyor 30 extends in a third direction of transfer 31 to supply a container from the first point of delivery 22 to a third point of transfer 27. The first conveyor 30 is a motorized roller conveyor of which the first motorization 32 is linked to the electronic control unit 90. The conveying device 20 also comprises a movable platform 33 provided with a second conveyor 34. The movable platform 33 is arranged to move the second conveyor 34 in a fourth, vertical direction of transfer 35 between the third point of transfer 27 and a fourth point of presentation 28. The fourth point of presentation 28 is situated vertically below the aperture 14 such that an internal volume 3.2 of a container 3 situated at the fourth point of presentation 28 is accessible by an operator from the external volume 12 through the aperture 14. The second conveyor 34 is a motorized roller conveyor of which the second motorization 36 is linked to the electronic control unit 90. The second conveyor 34 extends horizontally so as to transfer, when the second conveyor 34 is at the fourth point of presentation 28, a container from the fourth point of presentation 28 to the second point of evacuation 25 in a fifth direction of transfer 39. To this end, a third conveyor 37 with free rollers extends horizontally at the point of evacuation.

The movable platform 33 is a platform of scissor lift table type comprising a first connecting rod 37.1 and a second connecting rod 37.2 that are actuated as is known by a first actuator 38.

As can be seen in FIGS. 1 to 10, the first conveyor 30 has a first length L30 which is chosen to accommodate two containers 3 and the second length L34 of the second conveyor 34 is chosen to accommodate a single container 3.

Figure 2:
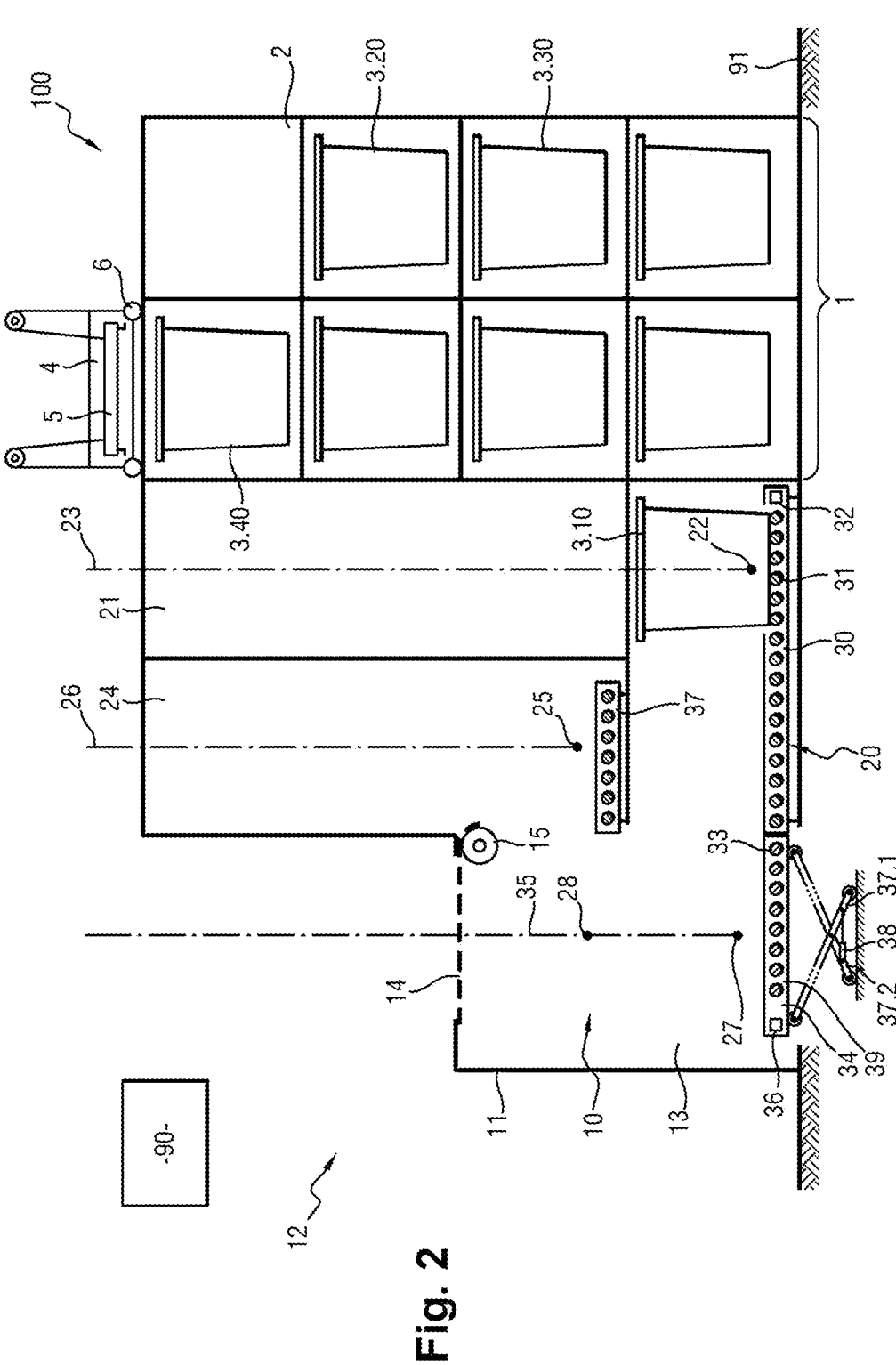
FIG. 2 is a view identical to that of FIG. 1 of the automated storage system in a second state.
Figure 3:
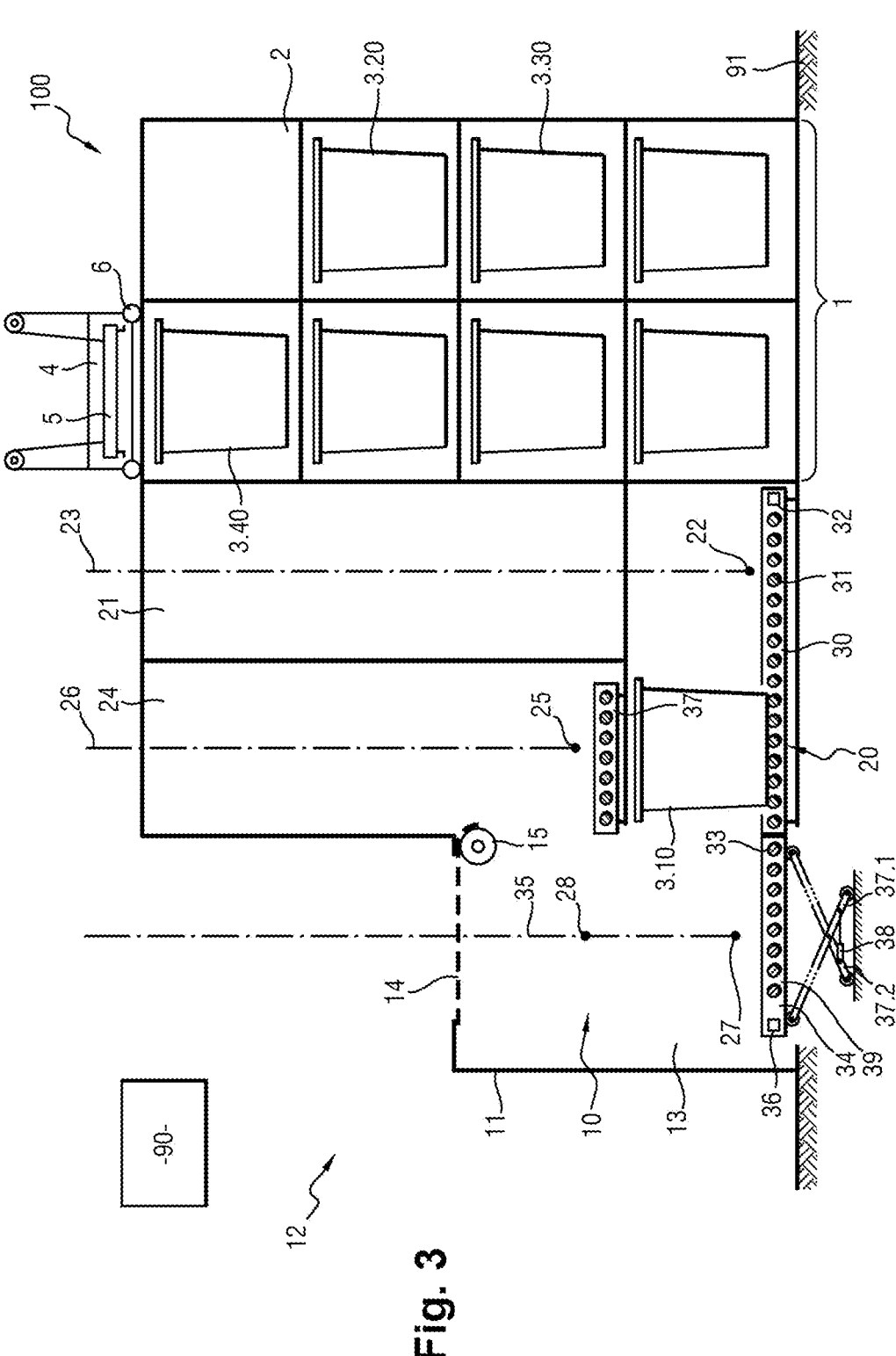
FIG. 3 is a view identical to that of FIG. 1 of the automated storage system in a third state.
Figure 4:
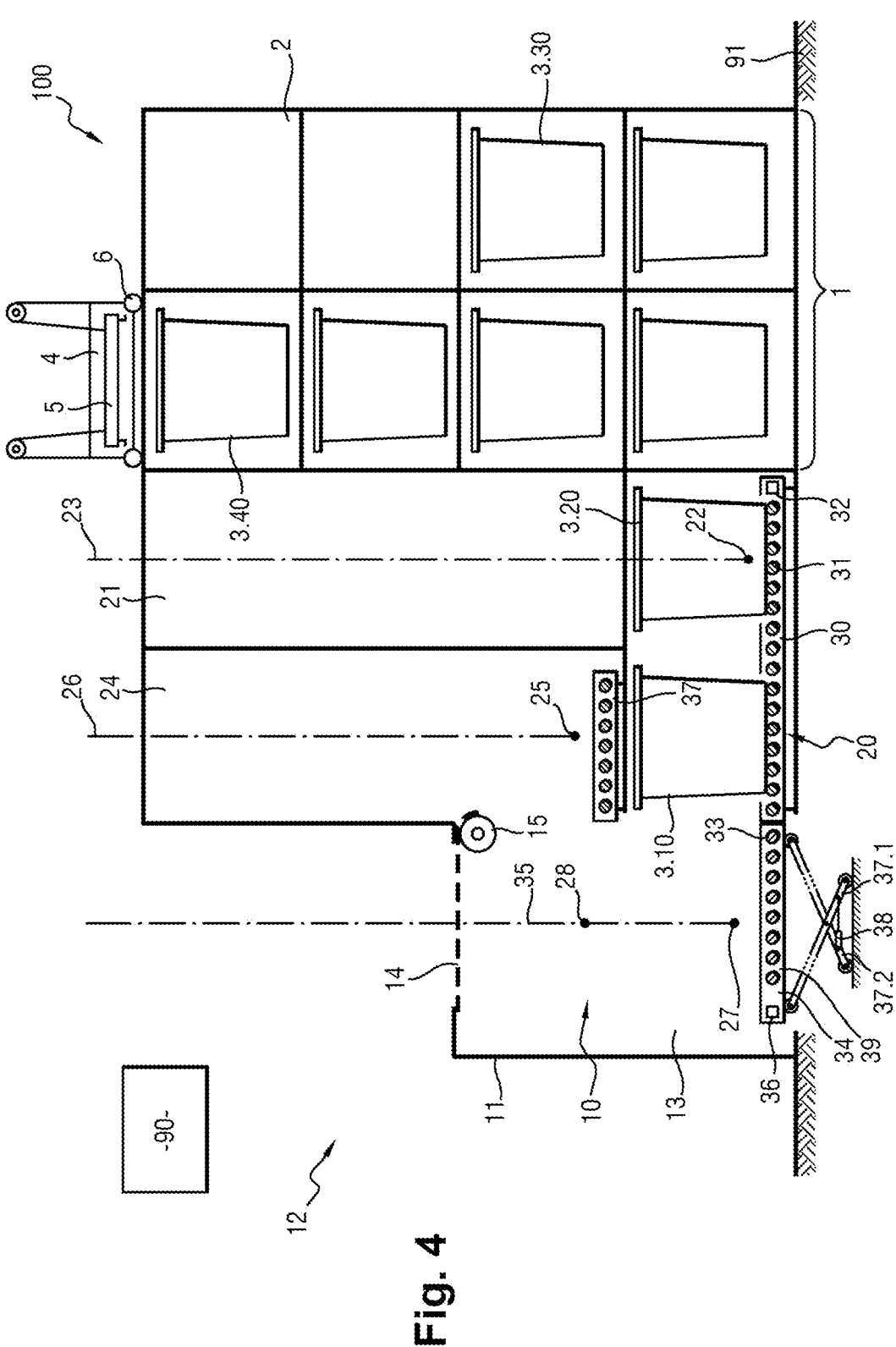
FIG. 4 is a view identical to that of FIG. 1 of the automated storage system in a fourth state.
Figure 5:
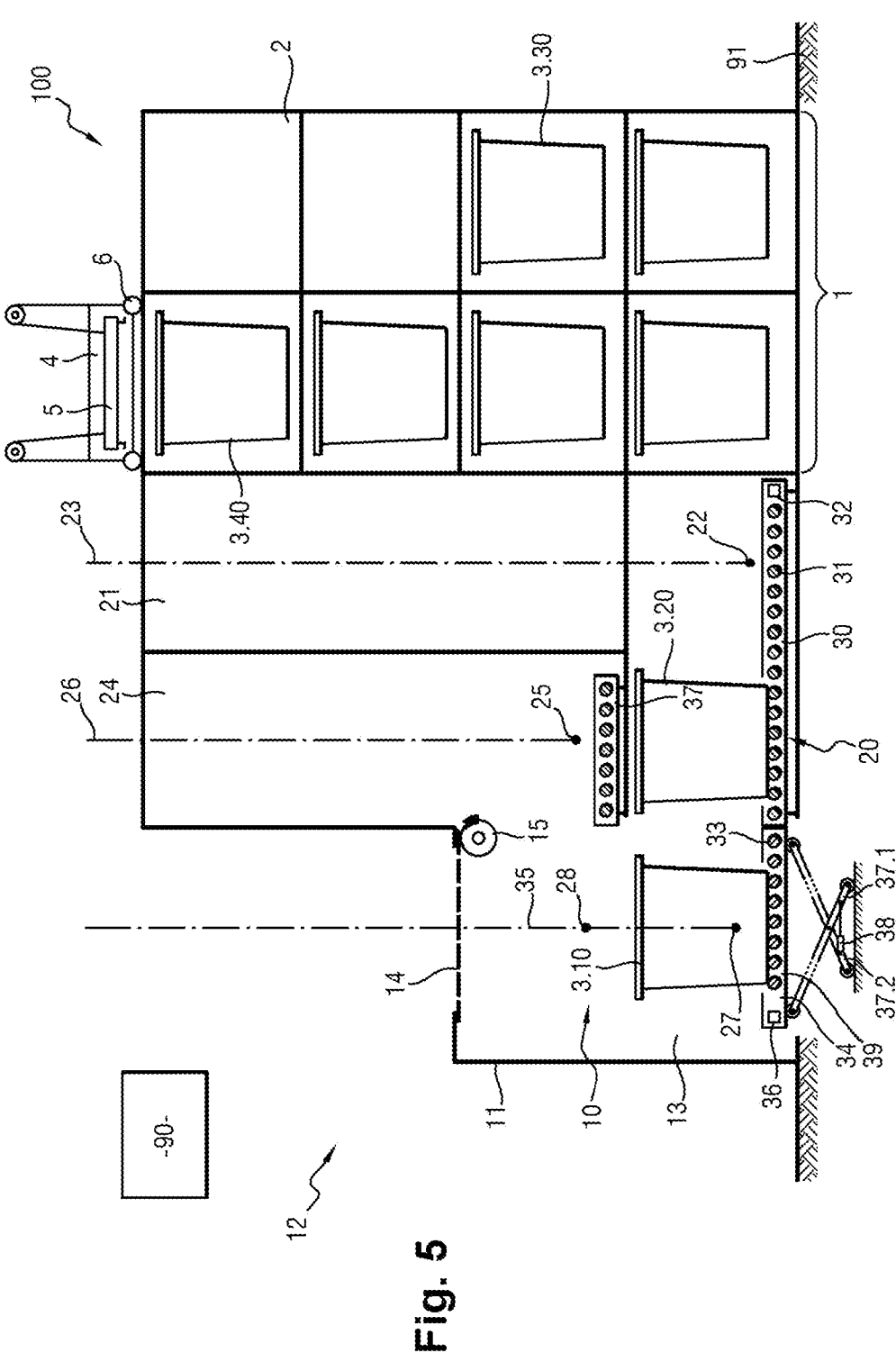
FIG. 5 is a view identical to that of FIG. 1 of the automated storage system in a fifth state.
Figure 6:
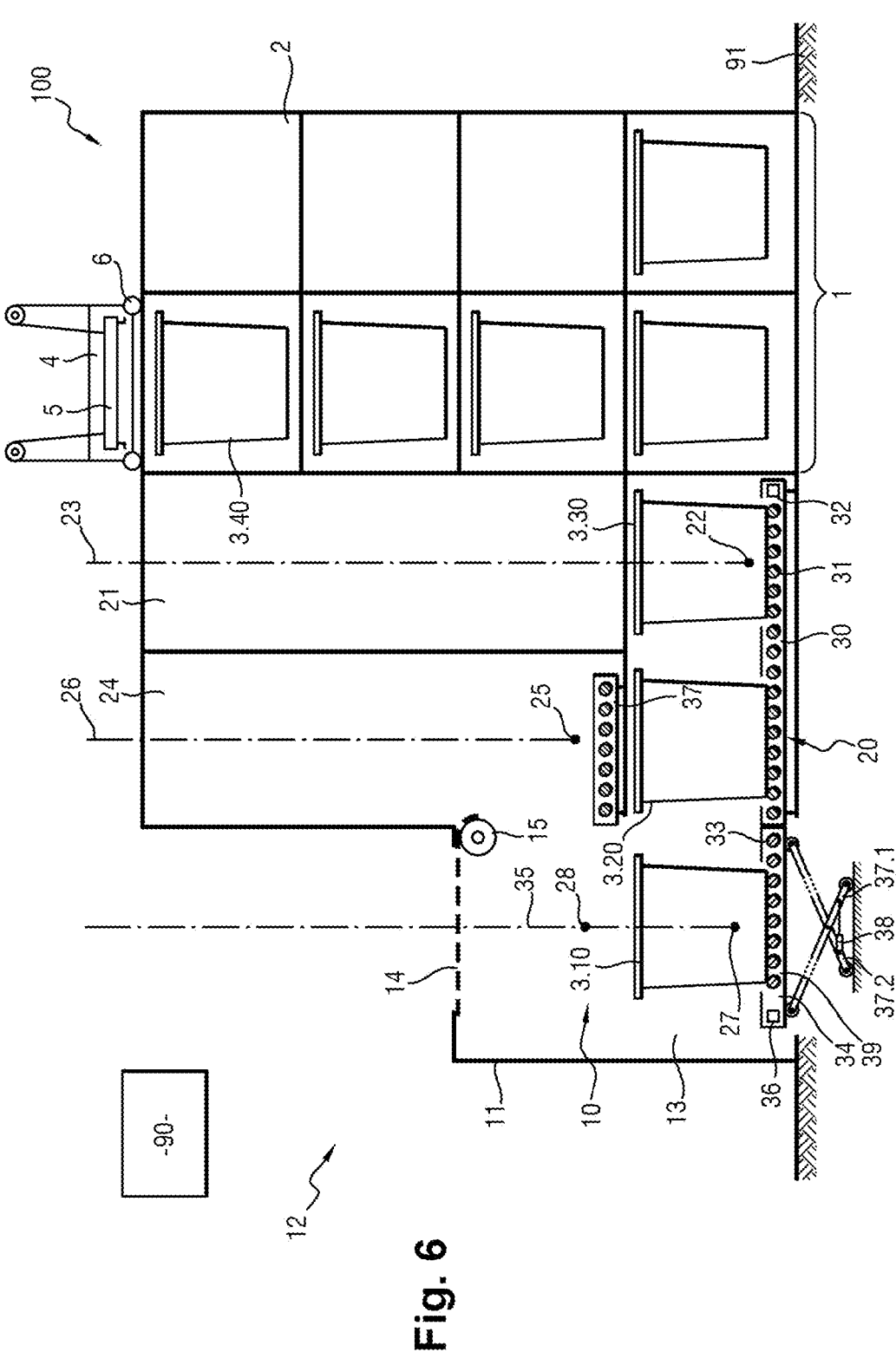
FIG. 6 is a view identical to that of FIG. 1 of the automated storage system in a sixth state.
Figure 7:
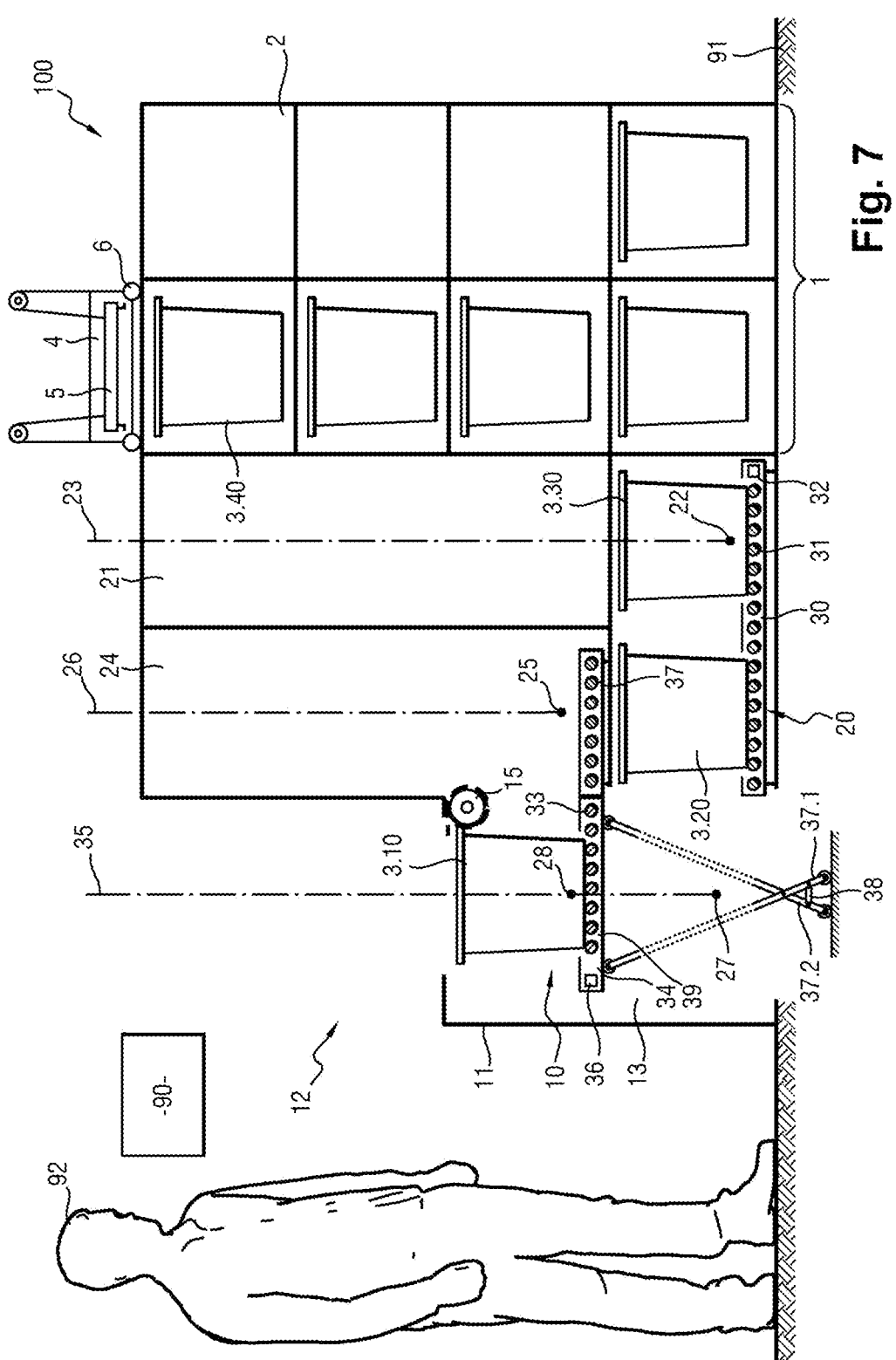
FIG. 7 is a view identical to that of FIG. 1 of the automated storage system in a seventh state.
Figure 8:
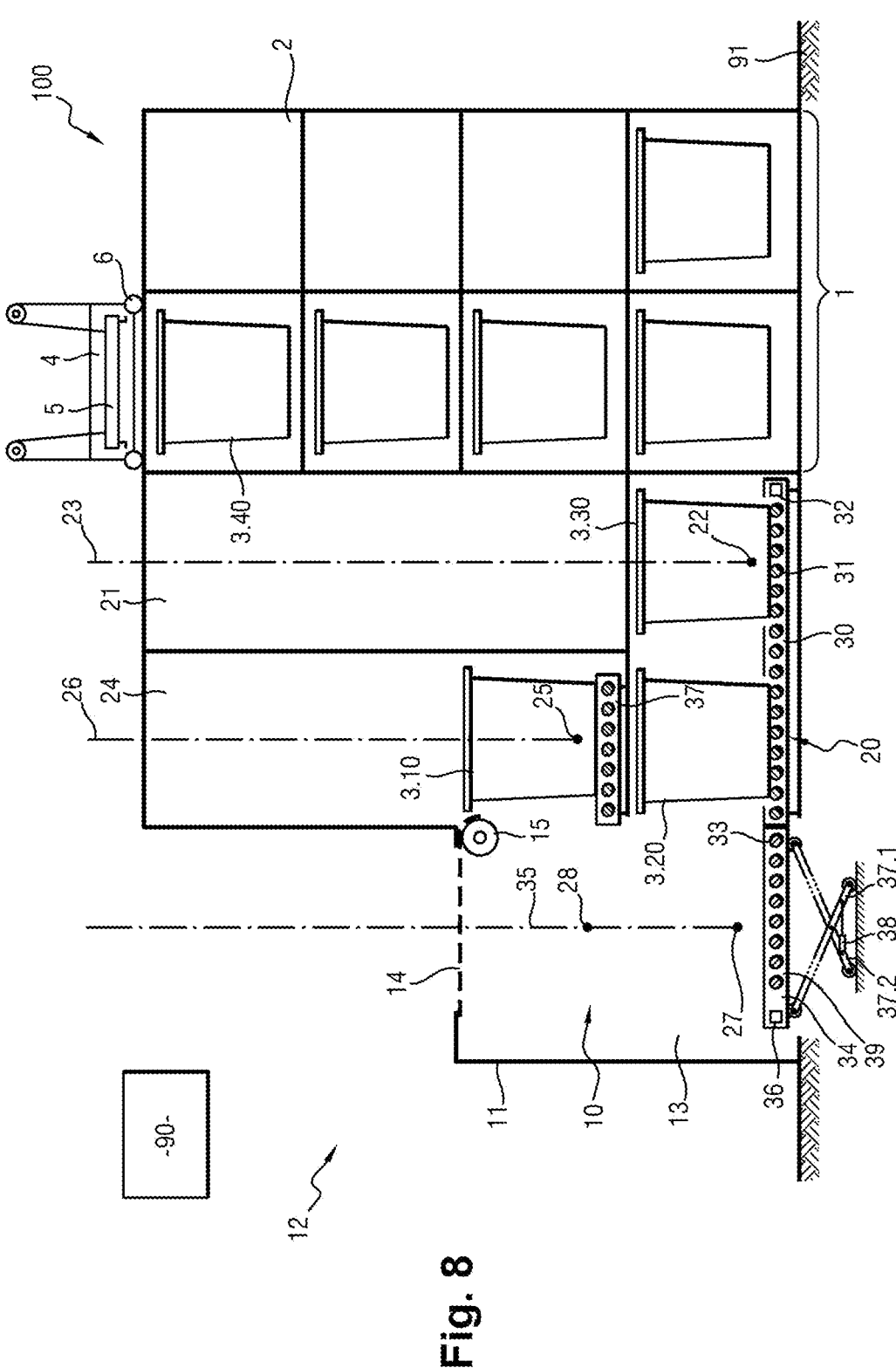
FIG. 8 is a view identical to that of FIG. 1 of the automated storage system in an eighth state.

In operation, the control unit 90 controls the automated trolley 4 for it to deposit the first container 3.10 at the first point of delivery by lowering it via the first chimney 21 (FIG. 2—first step). The control unit 90 then controls the first conveyor 30 so as to free the first point of deliver 22 while keeping the first container 3.10 on the first conveyor 30 (FIG. 3—second step). The control unit 90 then controls the automated trolley 4 for it to deposit the second container 3.20 at the first point of delivery 22 (FIG. 4—third step). According to a fourth step represented in FIG. 5, the control unit 90 controls the first conveyor 30 so as to transfer the first container 3.10 to the third point of transfer 27 on the second conveyor 34, the movable platform 33 having been previously lowered to be brought to the third point of transfer 27. According to a fifth step represented in FIG. 6, the control unit 90 controls the automated trolley 4 for it to deposit the third container 3.30 at the first point of delivery 22. During this step, the second motorization 36 of the second conveyor 34 can be driven or not. According to a sixth step represented in FIG. 7, the control unit 90 controls the first actuator 38 of the movable platform 33 so as to transfer the first container 3.10 from the third point of transfer 27 to the fourth point of presentation 28. In this deployed position of the movable platform 33, the second conveyor 34 is at the same level as the The control unit 90 then controls the shutter 15 so as to free the access aperture 14, allowing a user 92 to access the content of the first container 3.10 (FIG. 7). When the first container 3.10 is empty (the detection of such a state being able to be done for example by measuring the motor current consumed by the first actuator 38), the control unit 90 controls the closure of the shutter 15 so as to cover the access aperture 14 (seventh step). According to an eighth step, the control unit 90 controls the movable platform 33 so as to transfer the first container 3.10 from the fourth point of presentation 28 to the second point of evacuation 25. According to a ninth step, the control unit 90 controls the first actuator 38 and the movable platform 33 returns into a retracted position in which the second conveyor 34 is at the level of the first conveyor 30 (FIG. 8).

The cycle of operation can begin again at the first step by processing the second container 3.20 subject to evacuating of the first container 3.10 before the repeating of the eighth step of transfer of the second container 3.20 to the second point of evacuation 25.

Figure 9:
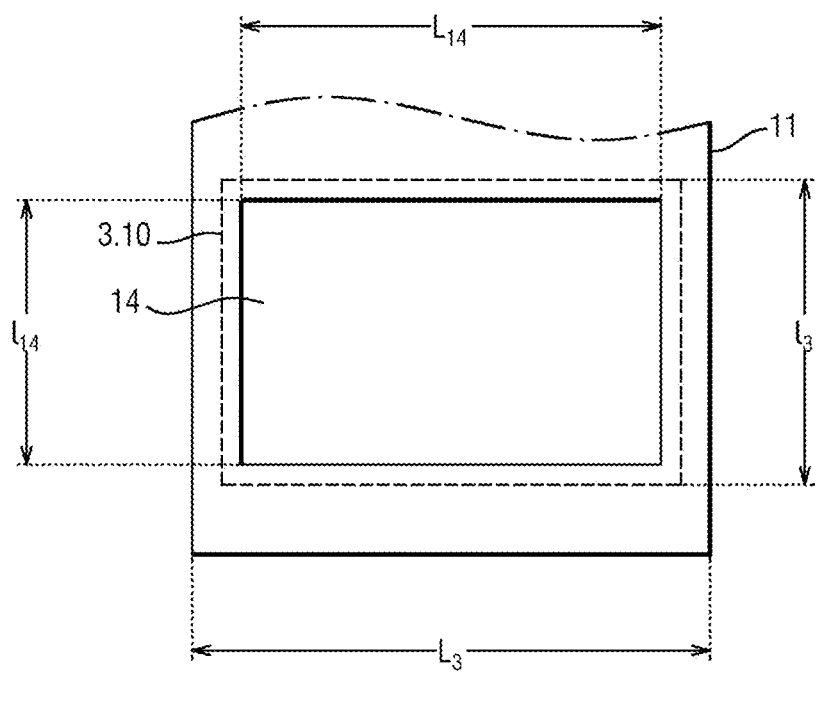
FIG. 9 is a detail view of the presentation system of the automated storage system of FIG. 1.
Figure 10:
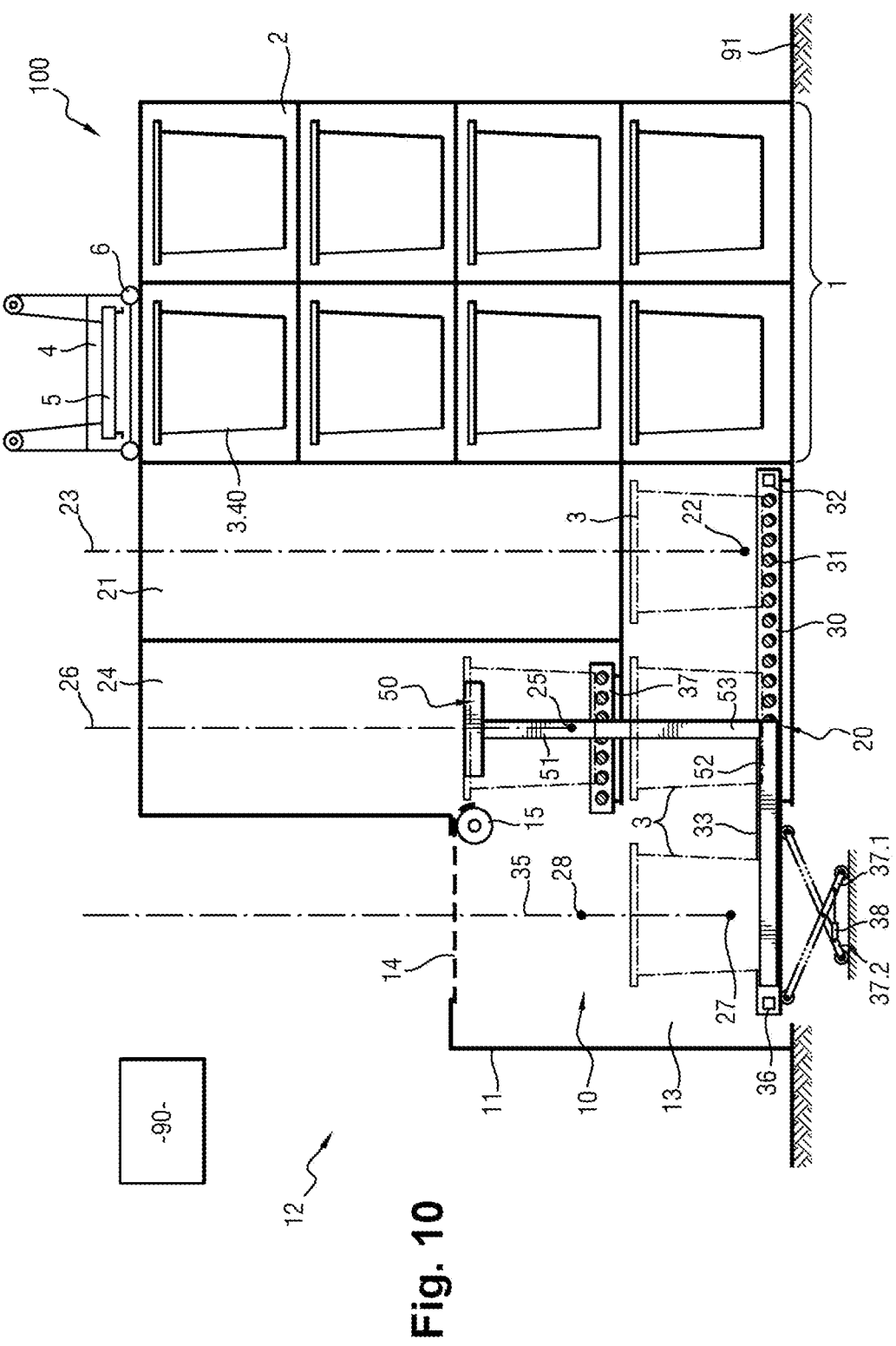
FIG. 10 is a plan schematic view of an automated storage system according to a second embodiment of the invention, the automated storage system being in a first state.

As can be seen in FIGS. 7 and 9, the first width 13 and the first length L3 of the containers 3 are respectively greater than the second width 114 and the second length L14 of the aperture 14.

The elements that are identical or similar to those previously described will bear a numeric reference identical to that in the following description of a second embodiment of the invention.

Referring to FIGS. 10 to 20, the presentation station 10 comprises a stacking device 50 for stacking containers 3 to produce a stack of containers. The device 50 comprises a first arm 51 and a second arm 61 fixed on either side of the movable platform 33.

Figure 11:
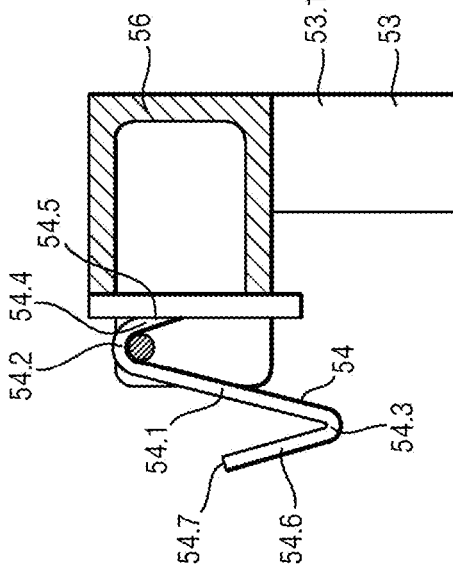
FIG. 11 is a detail schematic view of the jaws of the presentation system of the automated storage system of FIG. 10.
Figure 11:
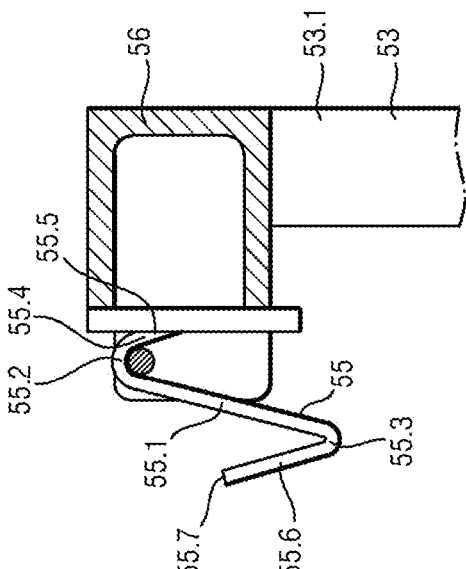
Figure 11:
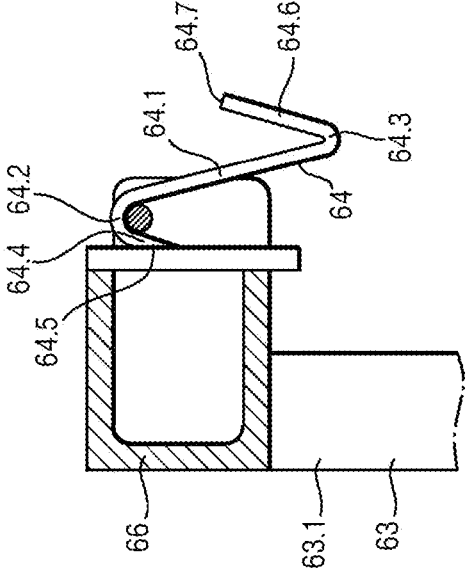
Figure 11:
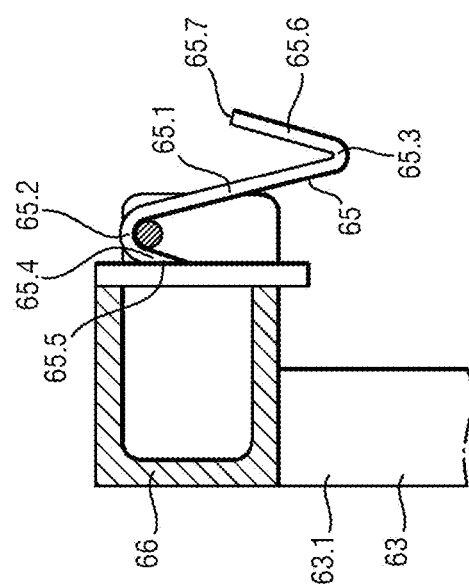

The first arm 51 is substantially L-shaped and comprises a first portion 52 which extends substantially parallel to the third direction of transfer 31 and which is secured to the movable platform 33. The first arm 51 also comprises a second portion 53 which extends substantially at 90 degrees from the first portion 52. A first elastic jaw 54 and a second elastic jaw 55 are mounted on a first crossmember 56 mounted at the first end 53.1 of the second portion 53. As can be seen in FIG. 11, the first elastic jaw 54 is substantially S-shaped and comprises a first central portion 54.1 delimited by a first inflexion 54.2 and a second inflexion 54.3. A first proximal portion 54.4 links the first inflexion 54.2 to the first proximal end 54.5. A first distal portion 54.6 links the second inflexion 54.3 to the first distal end 54.7. The first proximal end 54.5 bears on the first crossmember 56 and the first inflexion 54.2 rests on a shaft 56.1 secured to the first crossmember 56. The first distal end 54.7 is free. The second elastic jaw 55 is identical to the first elastic jaw 54 and comprises a second proximal end 55.5 bearing on the first crossmember 56 and a third inflexion 55.2 which rests on the shaft 56.1. The second jaw 55 also comprises a second central portion 55.1, a fourth inflexion 55.3 and a free second distal end 55.7.

Similarly, the second arm 61 is substantially L-shaped and comprises a third portion 62 which extends substantially parallel to the third direction of transfer 31 and which is secured to the movable platform 33. The second arm 61 also comprises a fourth portion 63 which extends substantially at 90 degrees from the third portion 62. A third elastic jaw 64 and a fourth elastic jaw 65 are mounted symmetrically to the first jaw 54 and to the second jaw 55 on a second crossmember 66 mounted at the second end 63.1 of the fourth portion 63.

As can be seen in FIG. 11, the third elastic jaw 64 comprises a third proximal end 64.5 bearing on the second crossmember 66 and a fifth inflexion 64.2 which rests on a third shaft 66.1 secured to the second crossmember 66. The third jaw 64 also comprises a third central portion 64.1, a sixth inflexion 64.3 and a free third distal end 64.7. The fourth elastic jaw 65 comprises a fourth proximal end 65.5 bearing on the second crossmember 66 and a seventh inflexion 65.2 which rests on a fourth shaft 66.2 secured to the second crossmember 66. The fourth jaw 65 also comprises a fourth central portion 65.1, an eighth inflexion 65.3 and a free fourth distal end 65.7.

According to this second embodiment, the containers 3 comprise a rim protruding peripherally from its upper portion. Thus, the first container 3.10 comprises a first peripheral rim 3.11 (FIGS. 15 to 17) and the second container 3.20 comprises a second peripheral rim 3.21.

Figure 14:
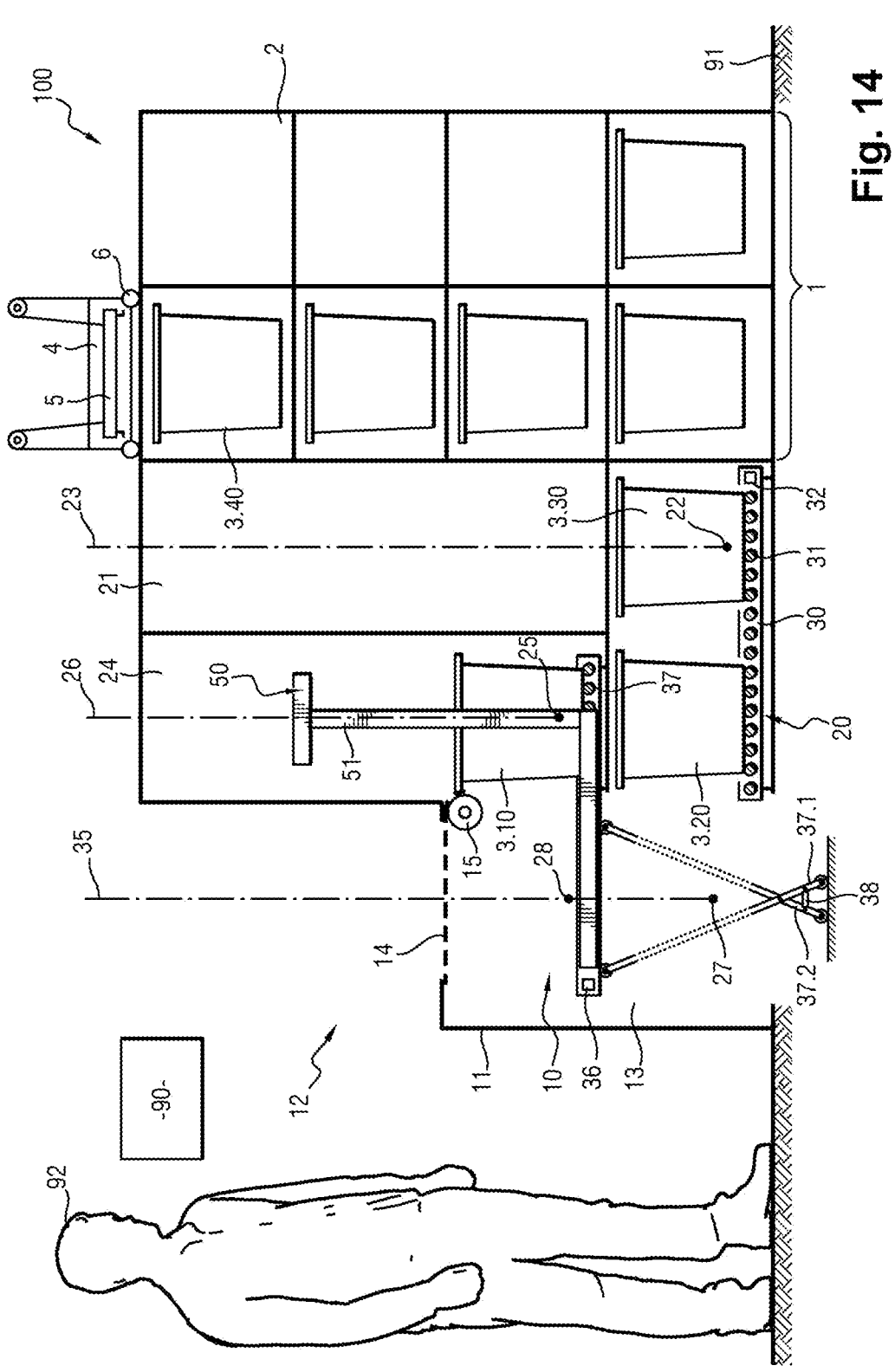
FIG. 14 is a view identical to that of FIG. 10 of the automated storage system in a second state.

In operation, and according to this second embodiment, the steps from the first to the eighth step are identical (FIGS. 2 to 7). FIG. 14 represents the configuration of the presentation station 10 at the end of the eighth step.

Figure 15:
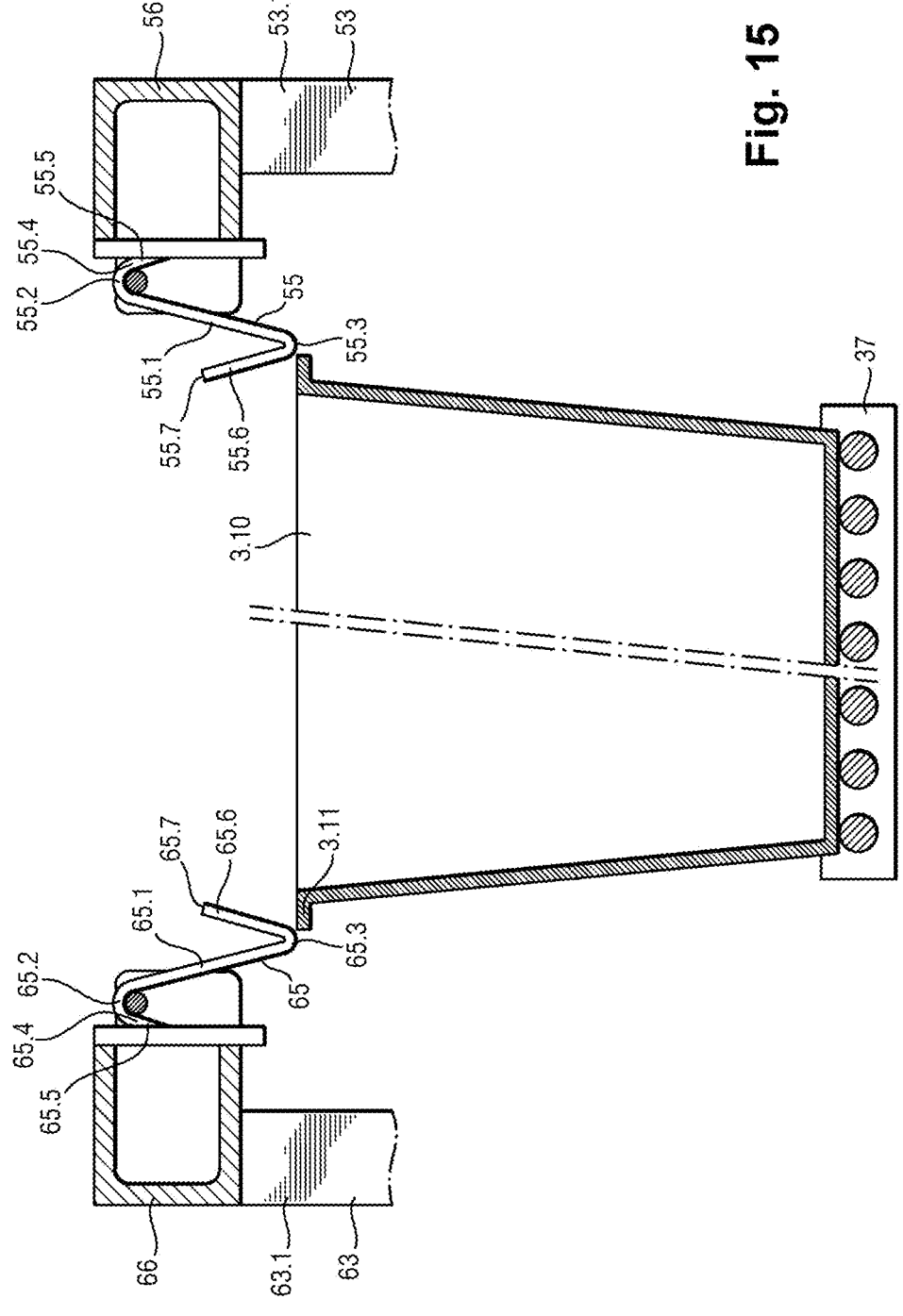
FIG. 15 is a detail view of the stacking device in a third state.

According to a ninth step, the control unit 90 controls the first actuator 38 so that the movable platform 33 returns to a retracted position in which the second conveyor 34 is level with the first conveyor 30. During this displacement of the movable platform 33, the first arm 51 and the second arm 61 perform a translational movement relative to the third conveyor 37 which bears the first container 3.10. This movement brings the first, second, third and fourth jaws 54, 55, 64 and 65 closer to the first rim 3.11 until the second inflexion 54.3, the fourth inflexion 55.3, the sixth inflexion 64.3 and the eighth inflexion 65.3 come into contact with the first rim 3.11 (FIG. 15).

Figure 16:
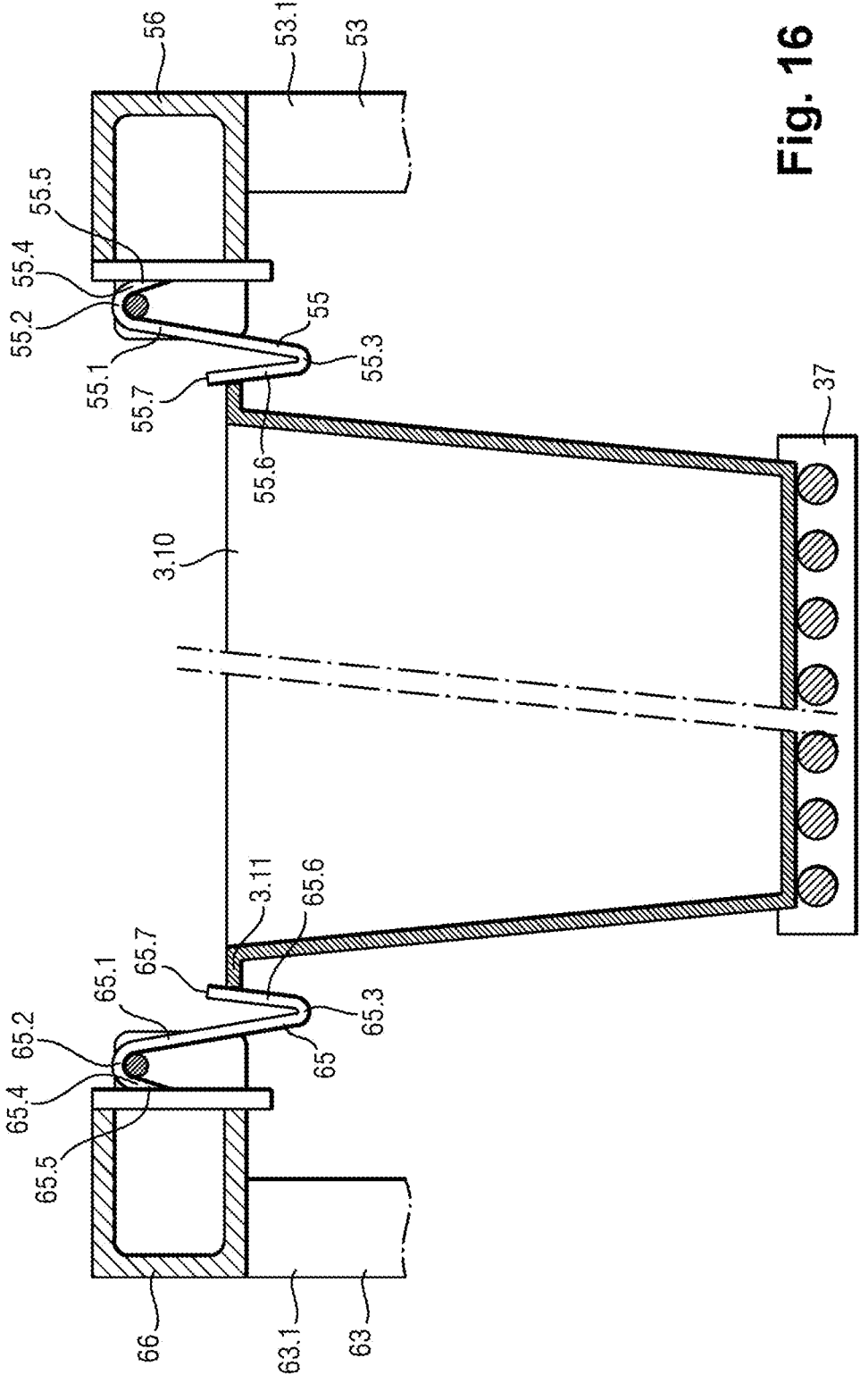
FIG. 16 is a detail view of the stacking device in a fourth state.
Figure 17:
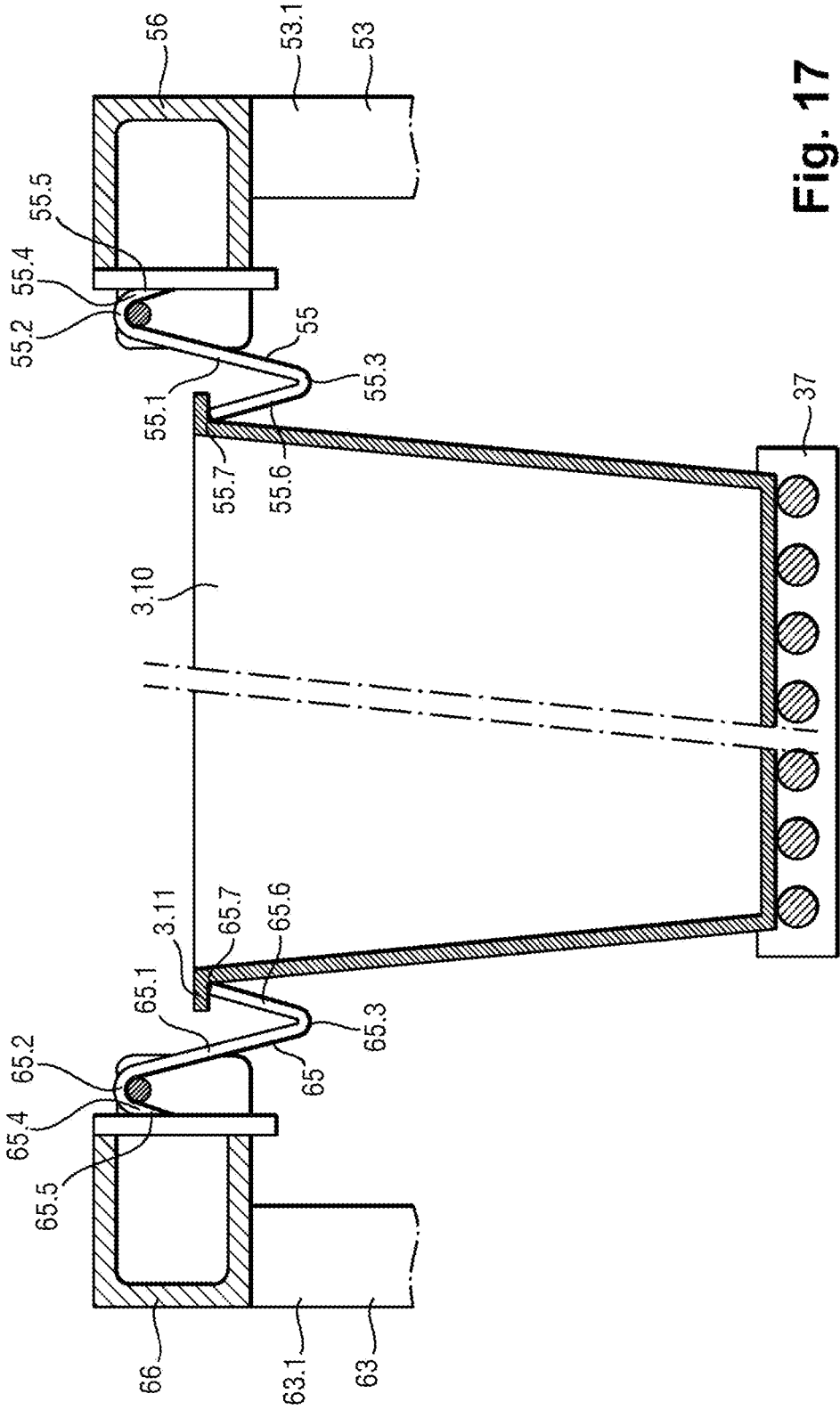
FIG. 17 is a detail view of the stacking device in a fifth state.

The continuation of the movement of the first arm 51 and of the second arm 61 relative to the first container 3.10 provokes a deformation of the first, second, third and fourth jaws 54, 55, 64 and 65 against the rim 3.11 (FIG. 16). When the movable platform 33 returns to its retracted position—in which the second conveyor 34 is level with the first conveyor 30—the first distal end 54.7, the second distal end 55.7, the third distal end 64.7 and the fourth distal end 65.7 are no longer facing the first rim 3.11 and move apart under the rim 3.11 by elastic release (FIG. 17).

Figure 12:
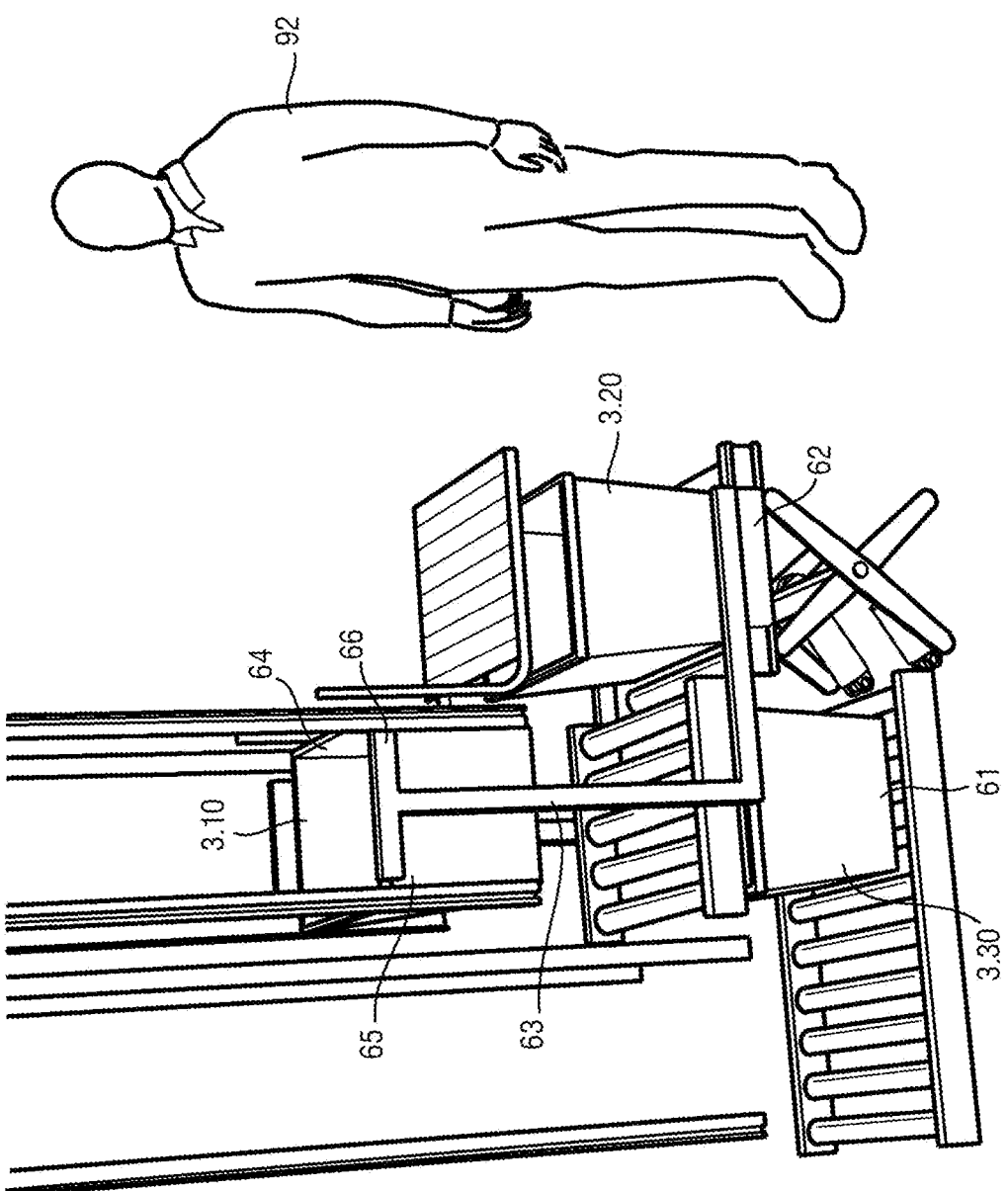
FIG. 12 is a perspective schematic view of the automated storage system of FIG. 10.
Figure 13:
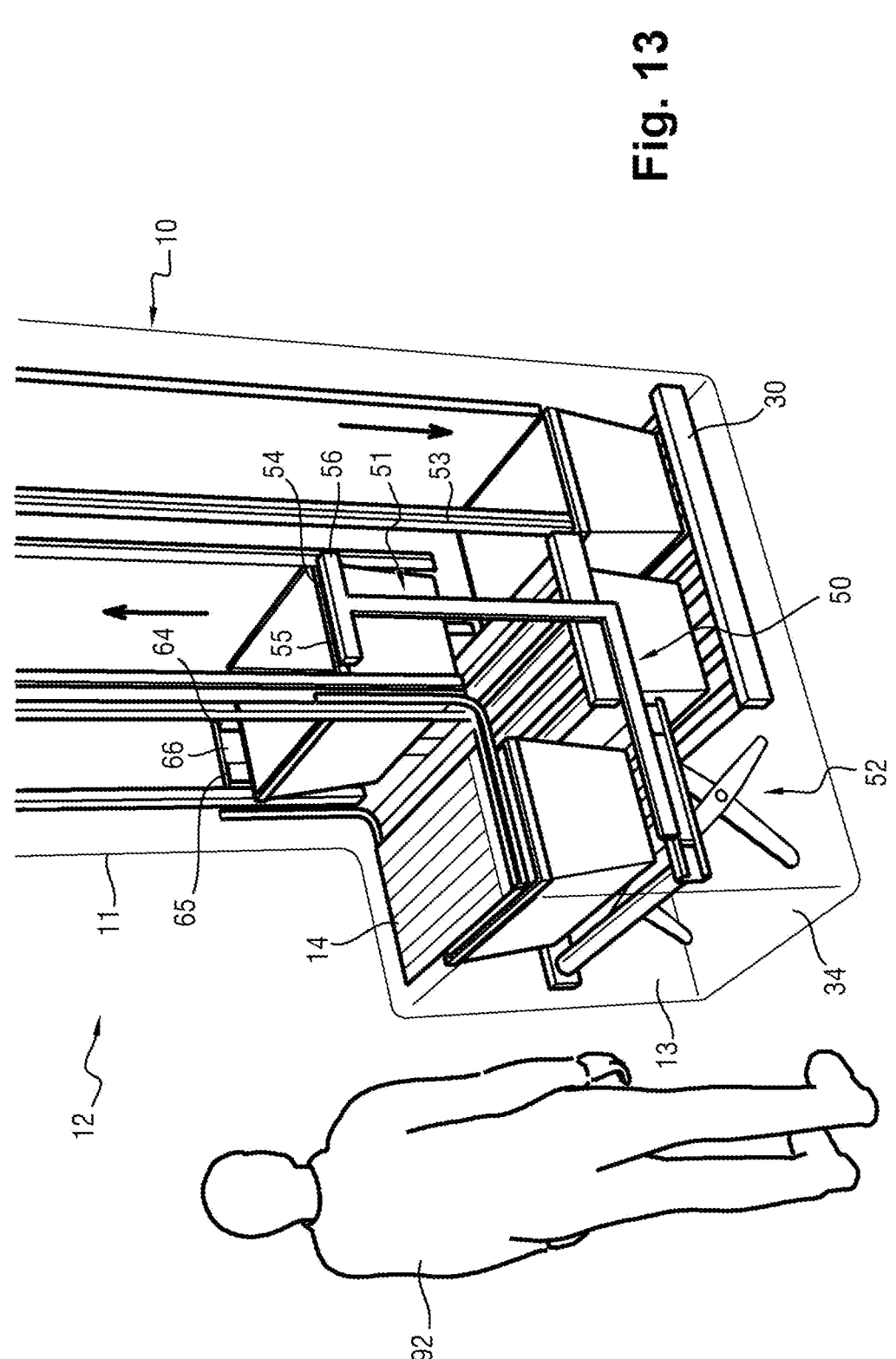
FIG. 13 is a perspective schematic view of the automated storage system of FIG. 10.
Figure 18:
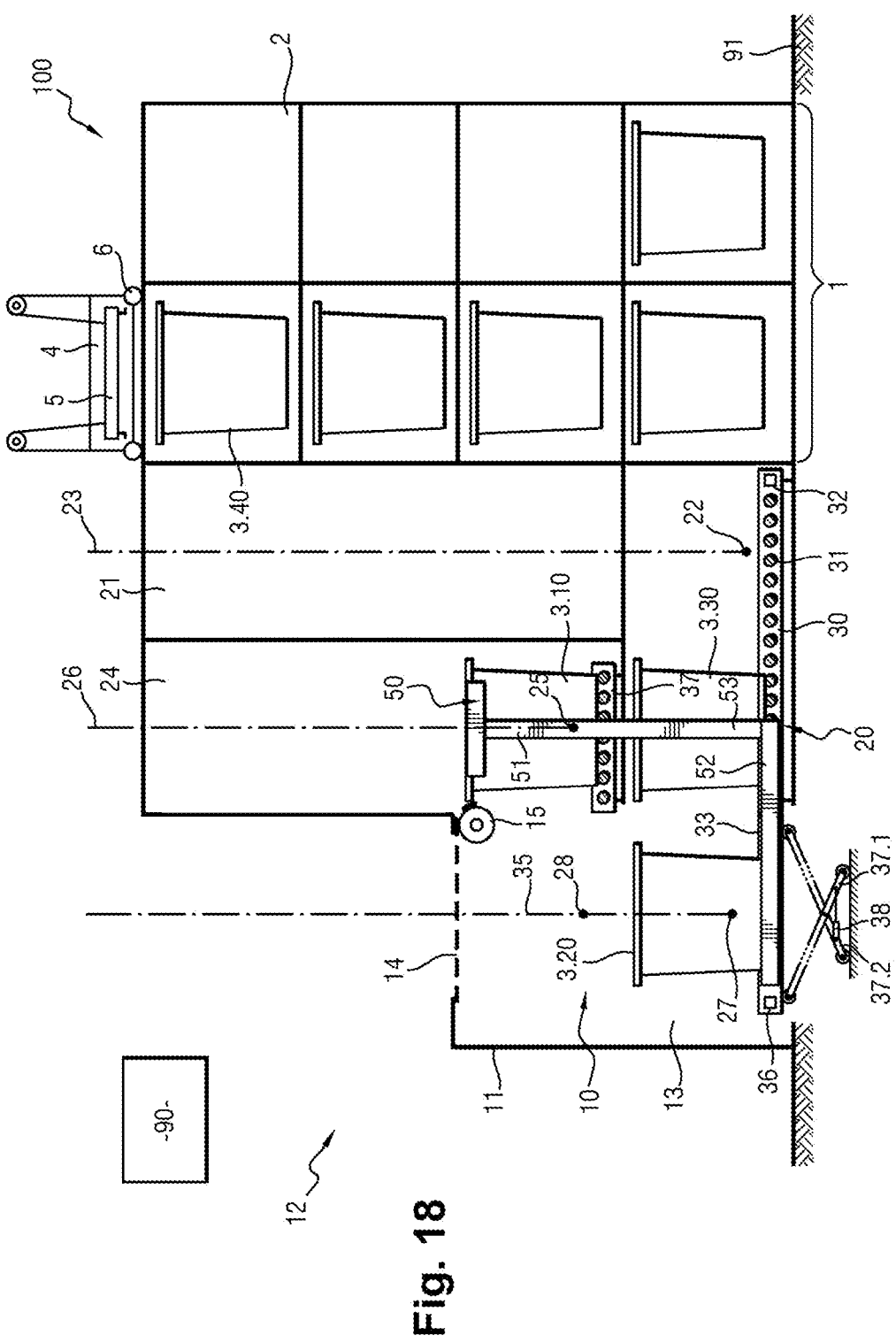
FIG. 18 is a view identical to that of FIG. 10 of the automated storage system in a sixth state.
Figure 19:
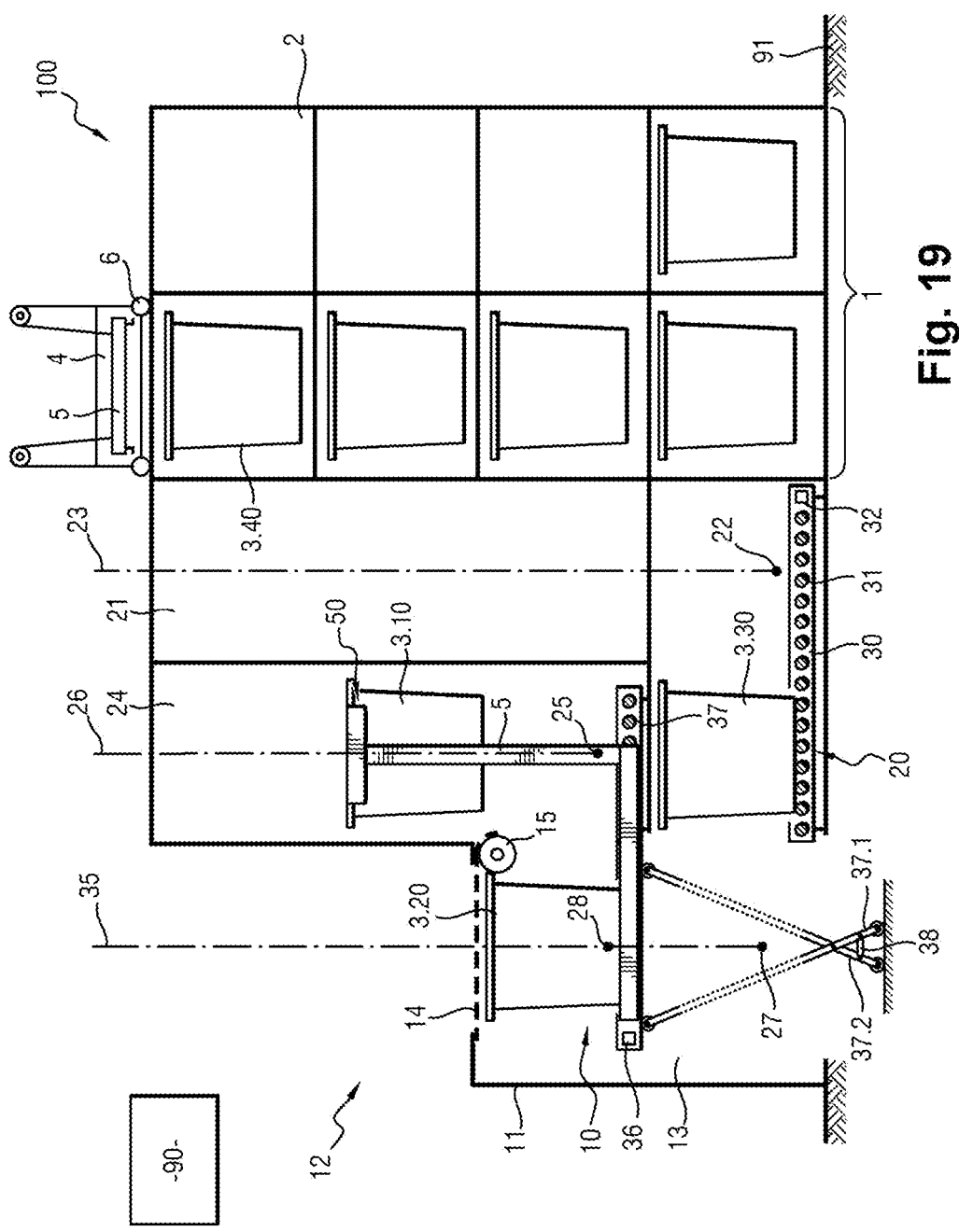
FIG. 19 is a view identical to that of FIG. 10 of the automated storage system in a seventh state.

During a tenth step identical to the fourth step, the control unit 90 controls the first conveyor 30 so as to transfer the second container 3.20 to the third point of transfer 27 on the second conveyor 34 (FIG. 18). According to an eleventh step identical to the sixth step, the control unit 90 controls the first actuator 38 of the movable platform 33 so as to transfer the second container 3.20 from the third point of transfer 27 to the fourth point of presentation 28. During this movement, the first arm 51 and the second arm 61 of the device 50 raise the first container 3.10 by a value substantially greater (by construction) than the first height H3 (FIGS. 12-13). After the opening and closing of the shutter 15, the control unit 90 controls the movable platform 33 so as to transfer the second container 3.20 from the fourth point of presentation 28 to the second point of evacuation 25 (twelfth step—FIG. 20). According to a thirteenth step, the control unit 90 controls the first actuator 38 and the movable platform 33 returns to its retracted position.

Figure 20:
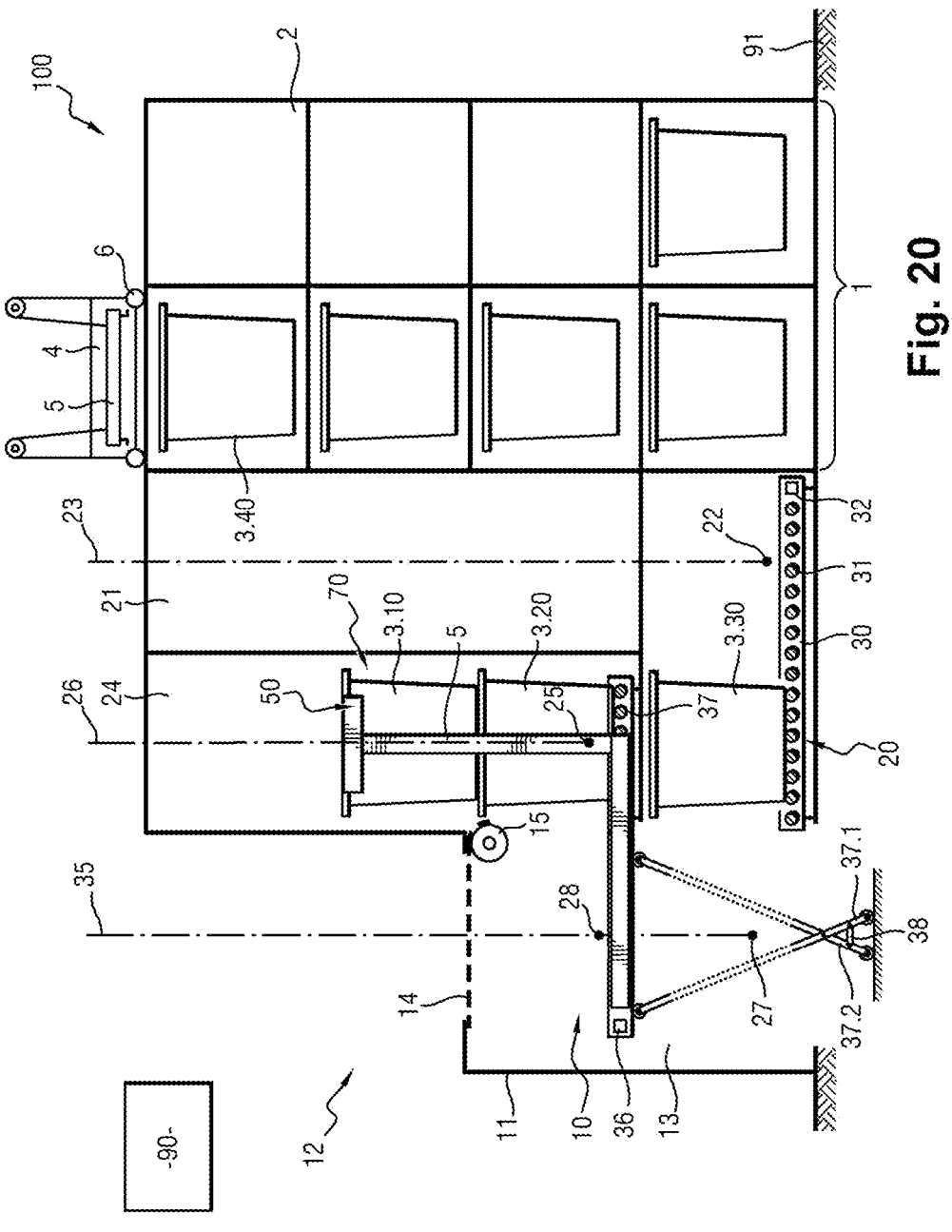
FIG. 20 is a view identical to that of FIG. 10 of the automated storage system in an eighth state.

During this displacement of the movable platform 33, the first arm 51 and the second arm 61 perform a translational movement relative to the third conveyor 37 which bears the second container 3.20. The base of the first container 3.10 then rests on the upper portion of the second container 3.20. The continuation of this translational movement brings the first, second, third and fourth jaws 54, 55, 64 and 65 closer to the second rim 3.21 until the second inflexion 54.3, the fourth inflexion 55.3, the sixth inflexion 64.3 and the eighth inflexion 65.3 come into contact with the second rim 3.21 and are deformed against the latter. When the movable platform 33 returns to its retracted position—in which the second conveyor 34 is level with the first conveyor 30—the first distal end 54.7, the second distal end 55.7, the third distal end 64.7 and the fourth distal end 65.7 are no longer facing the first rim 3.11 and move apart under the second rim 3.21 by elastic release (FIG. 20). A stack 70 of containers 3 comprising the first container 3.10 and the second container 3.20 has been constructed and rests at the second point of evacuation 25. This stack 70 can either be evacuated by the automated trolley 4 or accommodate the third container 3.30 according to the above method.

Obviously, the invention is not limited to the embodiments described but encompasses any variant falling within the scope of the invention as defined by the claims.

In particular, although here the construction of a stack of containers has been described in association with stackable containers, the invention applies equally to the production of a stack of insertable containers, that is to say containers of which a lower part can be accommodated at least partially by the internal volume of another identical container;

although here the automated system for storing and supplying containers comprises a presentation station, the invention applies equally to an automated system for storing and supplying containers comprising several presentation stations;

although here the storage volume encloses containers that are substantially parallelepipedal, the invention applies equally to other types of containers such as, for example, pallets or special containers of any form;

although here the presentation station comprises a shutter, the invention applies equally to other types of access aperture covering devices such as, for example, a sliding or leaf door, bars, a curtain or a rotary drawer;

although here the conveying device is fully contained in the frame, the invention applies equally to a conveying device partially contained in the internal volume, such as, for example, a conveying device of which the motors are outside the internal volume or of which a part of the conveyors is situated outside the internal volume;

although here the direction of supply and the direction of evacuation are vertical, the invention applies equally to other orientations of the direction of supply and the direction of evacuation such as, for example, horizontal directions, forming a non-zero angle with respect to the vertical, the directions of supply and the direction of evacuation being able to be different leading to a direction of supply and a direction of evacuation that are not parallel;

although here the conveying device comprises roller conveyors, the invention applies equally to other types of conveyors such as, for example, belt or skatewheel conveyors;

although here the first length and the first width are respectively greater than the second width and the second length of the aperture, the invention applies equally to other types of devices to prevent the extraction of a container through the access aperture such as, for example, bars, just one of the dimensions out of the length and width of the container which is greater than the length or the width of the aperture, container locking devices such as latches or clamps;

although here the container stacking device comprises four elastic jaws, the invention applies equally to other types of container gripping means controlled or not, such as, for example, controlled clamps, suckers, a magnet, a finger mounted on a spring or a cam. These devices can cooperate with containers without a rim or that have a different attachment interface such as a protruding spur or a notch;

although here the container stacking device comprises fixed arms secured to the platform, the invention applies equally to other types of configurations that make it possible to link the displacement movement of the movable platform and a container gripping action such as, for example, arms mounted to rotate on the movable platform and provided with position return means, a cam/follower system making it possible to separate the arms during the lowering of the movable platform, or even a set of cables and return pulleys linking jaws to the movable platform;

although here the second direction of evacuation is substantially parallel to the first direction of supply and the third direction of transfer is substantially orthogonal to the first direction of supply and to the second direction of evacuation, the invention applies equally to other relative orientations of the second direction of evacuation with the third direction of transfer;

although here the containers are supplied according to a first direction of supply by a first rectilinear run, the invention applies equally to a supply of the containers according to a non-rectilinear run such as, for example, a helical ramp or a first run comprising a plurality of different slopes, the first direction of supply then corresponding to the direction of the container which precedes its arrival at the first point of delivery. The same applies for the second direction of evacuation.

The invention claimed is:

1. A station for presenting at least one container comprising:

a frame delimiting an external volume and an internal volume and having an aperture for access to the internal volume;

a conveying device contained at least partially in the internal volume and which comprises a first chimney for supplying containers to a first point of delivery, the first chimney extending in a first direction of supply;

the conveying device also comprising:

a second chimney for evacuating containers from a second point of evacuation, the second chimney extending in a second direction of evacuation;

a first conveyor motorized to transfer a container in a third direction of transfer from the first point of delivery to a third point of transfer;

a movable platform provided with a second motorized conveyor, wherein the movable platform is arranged to move the second conveyor in a fourth direction of transfer between the third point of transfer and a fourth point of presentation arranged in such a way that an internal volume of a container situated at the fourth point of presentation is accessible by an operator from the external volume, the second conveyor being arranged to transfer a container from the fourth point of presentation to the second point of evacuation in a fifth direction of transfer such that the container is transferred exclusively in the fifth direction of transfer without any change of direction until the container reaches the second point of evacuation.

2. The presentation station as claimed in claim 1, wherein the movable platform is of "scissor lift table" type.

3. The presentation station as claimed in claim 1, wherein, the second direction of evacuation and the first direction of supply being substantially rectilinear, the second direction of evacuation is substantially parallel to the first direction of supply and/or the third direction of transfer is substantially orthogonal to the first direction of supply and/or orthogonal to the second direction of evacuation.

4. The presentation station as claimed in claim 1, wherein the fourth direction is substantially orthogonal to the third direction.

5. The presentation station as claimed in claim 1, comprising a covering device for covering the access aperture.

6. The presentation station as claimed in claim 1, wherein, when the frame rests on a horizontal support, the first direction of supply, the second direction of evacuation and the fourth direction of transfer are vertical, and wherein the third direction of transfer and the fifth direction of transfer are horizontal.

7. The presentation station as claimed in claim 1, comprising a device for preventing the extraction of a container through the access aperture.

8. The presentation station as claimed in claim 1, comprising a stacking device for stacking containers to produce a stack of containers resting at the second point of evacuation.

9. The presentation station as claimed in claim 8, wherein the stacking device for stacking containers comprises an arm linked to the movable platform.

10. The presentation station as claimed in claim 9, wherein the stacking device for stacking containers comprises at least one elastic jaw.

11. An automated system for storing and supplying containers comprising a storage volume linked to at least one presentation station as claimed in claim 1.

12. An automated system for storing and supplying containers as claimed in claim 11, wherein the storage volume comprises a plurality of cells each enclosing a container and wherein the first length of the first conveyor is chosen to accommodate two containers and/or the second length of the second conveyor is chosen to accommodate a single container.

13. A method for presenting containers implemented by a presentation station as claimed in claim 1, comprising the following steps:

depositing a first container at the first point of delivery;

controlling the first conveyor so as to transfer the first container to the third point of transfer;

actuating the movable platform so as to transfer the first container from the third point of transfer to the fourth point of presentation;

controlling the second conveyor so as to transfer the first container from the fourth point of presentation to the second point of evacuation.

14. The method for presenting containers as claimed in claim 13, wherein the first length of the first conveyor is chosen to accommodate two containers and the second length of the second conveyor is chosen to accommodate a single container, the method further comprising the following additional steps:

prior to the step of controlling the first conveyor so as to transfer the first container from the first point of delivery to the third point of transfer, controlling the first conveyor so as to free the first point of delivery while keeping the first container on the first conveyor;

depositing a second container at the first point of delivery;

following the step of controlling the first conveyor so as to transfer the first container to the third point of transfer, depositing a third container at the first point of delivery.

15. The method for presenting containers as claimed in claim 13, wherein the presentation station comprises a covering device for covering the access aperture, the method comprising an additional step, situated between the step of actuating the movable platform so as to transfer the first container from the third point of transfer to the fourth point of presentation and the step of controlling the second conveyor so as to transfer the first container from the fourth point of presentation to the second point of evacuation, the additional step consisting in actuating the covering device so as to free the access aperture then actuating the covering device so as to cover the access aperture.

16. The method for presenting containers as claimed in claim 13, wherein the presentation station comprises a stacking device for stacking containers to produce a stack of containers resting at the second point of evacuation, the method comprises the step of producing a stack of containers at the second point of evacuation.

* * * * *